US006255589B1

(12) United States Patent
Starck et al.

(10) Patent No.: US 6,255,589 B1
(45) Date of Patent: Jul. 3, 2001

(54) HERMETICALLY SEALED CURRENT FEEDTHROUGH FOR OUTDOOR ELECTRICAL GEAR

(75) Inventors: Thierry Starck, Castries; Kenneth Johnson, Montpellier, both of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/466,110

(22) Filed: Dec. 17, 1999

(30) Foreign Application Priority Data

Dec. 18, 1998 (FR) ..................................................... 98 15982

(51) Int. Cl.[7] ..................................................... H02G 15/013
(52) U.S. Cl. ..................................................... 174/74 A; 174/142
(58) Field of Search ..................................................... 174/77 R, 74 R, 174/75 B, 74 A, 31 R, 142, 152 R, 50.5, 50.56, 50.59, 53, 65 R; 200/84 R

(56) References Cited

U.S. PATENT DOCUMENTS 3,018,318 * 1/1962 Franklin ..................................................... 174/142 X
3,178,505 * 4/1965 Van Sickle ..................................................... 174/31 R
3,318,995 * 5/1967 Buckley et al. ..................................................... 174/142
3,523,157 * 8/1970 Bauer et al. ..................................................... 174/142
3,705,281 12/1972 Luehring ..................................................... 174/142 X
4,431,859 * 2/1984 Kishida ..................................................... 174/31 R
4,670,625 * 6/1987 Wood et al. ..................................................... 174/142

FOREIGN PATENT DOCUMENTS 32 08 358 A1 9/1983 (DE) .
2 729 785 A1 7/1996 (FR) .

* cited by examiner

*Primary Examiner*—Dean A. Reichard
*Assistant Examiner*—Chau N. Nguyen
(74) *Attorney, Agent, or Firm*—Sughrue, Mion, Zinn, Macpeak & Seas, PLLC

(57) ABSTRACT

The current feedthrough is more particularly intended to provide connection to a bare conductor of a piece of gear housed inside metal cladding including a wall provided with an opening designed to put a conductive element of the gear into connection with one end of a conductive element housed axially inside the feedthrough. It includes a metal link and screen piece of cylindrical appearance that is held coaxially about the conductive element by a body of molded insulating material covering it in part and forming a plug that is impermeable to gas. The link and screen piece is terminated by a cylindrical portion projecting from the body, with the piece being welded to the periphery of the opening via the end of its cylindrical portion.

7 Claims, 2 Drawing Sheets

HERMETICALLY SEALED CURRENT FEEDTHROUGH FOR OUTDOOR ELECTRICAL GEAR

The invention relates to a hermetically sealed current feedthrough for gas-insulated outdoor electrical gear, and more particularly to a current feedthrough for connecting a bare conductor to a metal-clad piece of gear whose metal cladding is grounded.

BACKGROUND OF THE INVENTION

There exist current feedthroughs for outdoor electrical gear that are made of molded synthetic material. An example of such a feedthrough is shown in FIG. 1, said feedthrough comprising a central conductor 1 having insulating resin 2 overmolded thereon and including a molded fixing flange 3 of the same material. A field-controlling screen 4 is generally embedded in the resin between the flange and the conductor in the zone where the feedthrough is mounted in the opening provided for it in a wall 5 of the metal cladding of a piece of gear. The flange is fixed to the wall by bolts in a manner that is not shown herein, and it possesses an annular groove for a sealing gasket 6 enabling the feedthrough to be mounted on the wall in hermetically sealed manner. That type of feedthrough suffers from the drawbacks of using a material that is relatively fragile, of requiring the use of a gasket which is difficult to assemble, and of a field-controlling screen whose positioning is critical. In addition, the conical outside shape of the feedthrough in the stress zone that lies between the flange and the fins 7 is unsuitable for receiving a toroidal current transformer.

There also exist composite type feedthroughs, an example of which is shown in FIG. 2. Such a feedthrough has a core of molded resin 9 about a central conductor 8 and a fixing flange 10 that is integrally molded with the core. The outside surface of the flange and of a cylindrical portion 10A of the core immediately adjacent to the flange is covered in a conductive covering 11 that is designed to be grounded when the feedthrough is in place. The metal-covered cylindrical portion 10A is suitable for enabling at least one toroidal current transformer 12 to be installed thereon in the vicinity of the fixing flange. An electric field distributing cone 13 is threaded onto the core after the current transformer(s) and before a series of fins 14 of elastomer material which are stacked on the core one after the other. Functionally, the cone is equivalent to the conical stress zone included in the feedthrough shown in FIG. 1, and it serves to control the field at the end of the metal covering, overlying the cylindrical portion 10A and a portion of itself following said cylindrical portion when the feedthrough is assembled. The desired electrical creepage distance is obtained by means of the stack of fins 14 in a manner that is known to the person skilled in the art. This second type of feedthrough is fixed on the wall 15 of the metal cladding of piece of gear in the same manner as is the first type described above, and it requires the same type of sealing gasket to be installed, so it suffers from the same drawbacks in this respect. It also suffers from the drawback of using a relatively large number of different parts so that manufacture and assembly thereof gives rise to a succession of operations, and in particular of manual operations. Finally, if ever it is necessary to replace a toroidal transformer, e.g. following a failure, it is necessary to dismantle the fins and the electric field distributing cone.

SUMMARY OF THE INVENTION

The invention thus proposes a hermetically sealed current feedthrough for gas-insulated outdoor electrical gear, the feedthrough being intended more particularly to provide connection to a bare conductor of a piece of gear housed inside metal cladding including a wall provided with an opening designed to put a conductive element of the gear into connection with one end of a conductive element housed axially inside the feedthrough.

According to the invention the current feedthrough includes a metal link and screen piece of cylindrical appearance that is held coaxially about the conductive element by a body of molded insulating material covering it in part and forming a plug that is impermeable to gas, and said link piece is terminated by a cylindrical portion projecting from the body, with said piece being welded to the periphery of the opening via the end of said cylindrical portion.

BRIEF DESCRIPTION OF THE DRAWINGS

The invention, its characteristics, and its advantages are described in greater detail in the following description given with reference to FIG. 3 in the list of figures given below, in which.

DETAILED DESCRIPTION OF THE PREFERRED EMBODIMENT

Figure 1:
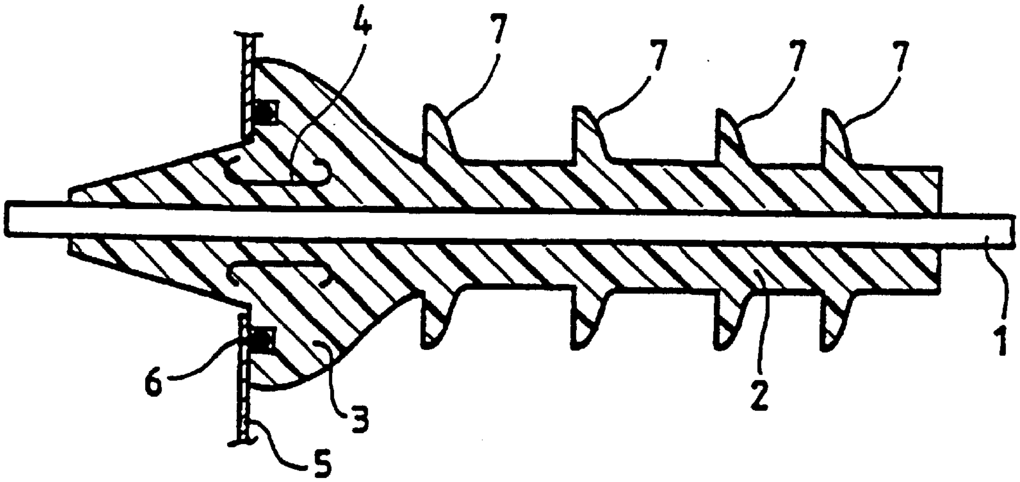
FIG 1 Prior art
FIG. 1 shows an example of a first known current feedthrough.
Figure 2:
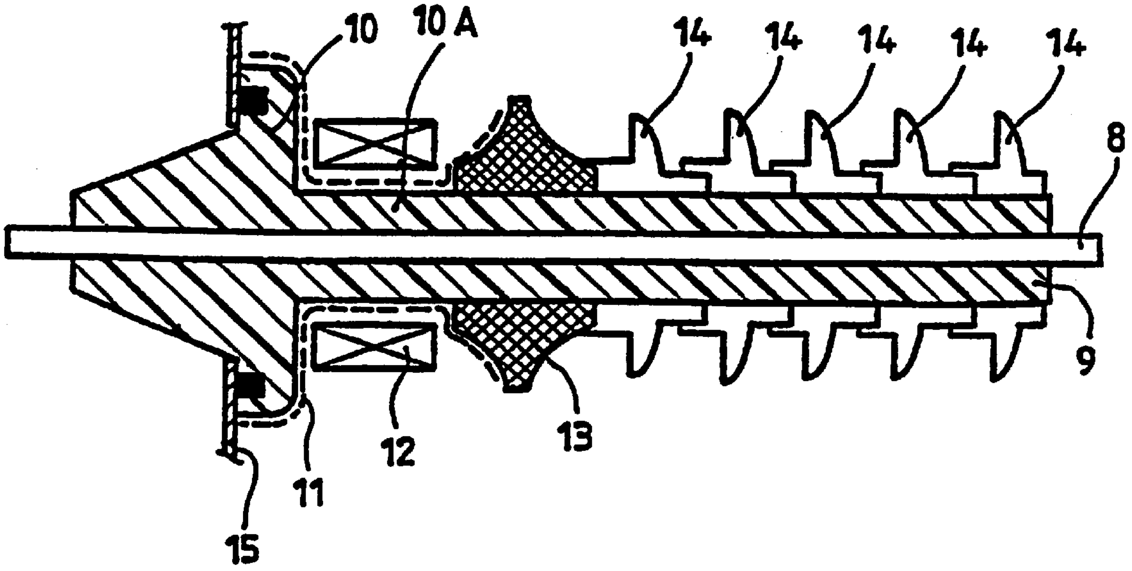
FIG 2 Prior art
FIG. 2 shows an example of a second known current feedthrough.
Figure 3:
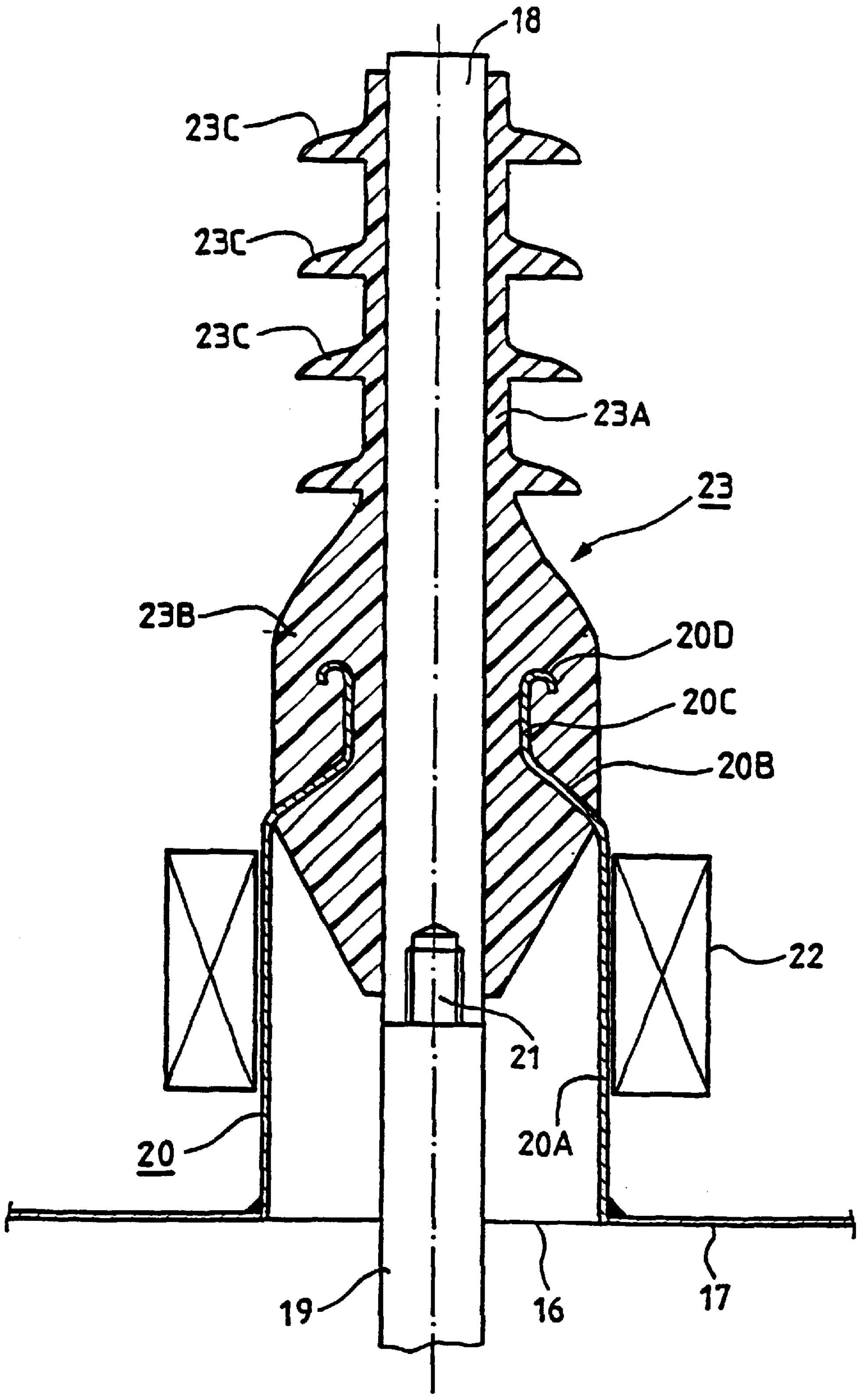
FIG. 3 shows an example of a current feedthrough of the invention.

The current feedthrough of the invention as shown in FIG. 3 is designed to be mounted in an opening 16 provided for that purpose in a metal wall 17 of the metal cladding of a piece of electrical gear housed in casing that is kept hermetically sealed and filled with an electrically insulating gas, or that is possibly under a vacuum. The feedthrough has an axial conductive element 18 designed to be connected to a corresponding conductive element 19 of the piece of gear contained inside the cladding. In the embodiment shown, this conductive element 19 projects from the cladding of the electrical gear, through the opening 16 in the cladding, and it is connected end-to-end with the conductive element 18 which is screwed onto a threaded rod 21 carried by the conductive element 19.

A link and screen piece 20 enables the feedthrough to be fixed to the cladding, it is cylindrical in appearance, and it constitutes a metal flange suitable for welding to the cladding. In the example shown, this piece is centered on the conductive element 18 whose end for fixing to the conductive element 19 penetrates part of the way into it. By way of example, this link and screen piece 20 is made of stainless steel, it has a portion 20A constituted by a circular cylinder whose diameter corresponds to the diameter of the opening 16 in the cladding 17 to which it is fixed in leakproof manner by welding, and without using a gasket. This link and screen piece is thus at the same potential as the remainder of the cladding of the gear, which potential is usually ground potential. The length of the portion 20A is selected so as to enable it to receive externally one or more toroidal current transformers 22 of appropriate diameter that are placed thereabout.

The portion of the link and screen piece 20 opposite from its portion welded to a wall 17 of the cladding of the gear, is extended by a portion 20B of progressively tapering diameter that is at least approximately frustoconical in appearance. This portion 20B is itself extended by a short, circularly-cylindrical element 20C whose end 20D flares outwards to present an edge that is rolled-over. The diameter of the portion 20C lies between the diameter of the conductive element 18 and the diameter of the portion 20A. The piece 20 is shaped in such a manner as to constitute a screen for controlling the electric field which is established between itself (ground potential) and the conductive element 18 when the element is live. It is prevented from moving relative to the conductive element 18 by a body 23 made of insulating material.

This feedthrough body 23 is made by being molded onto the conductive element 18 which it covers except at both ends, and also by being molded over the portions 20B, 20C, and 20D of the link and screen piece which are embedded therein. It is of tubular shape, it forms a plug, and it extends along the longitudinal axis of the of the conductive element 18 of the current feedthrough.

In a preferred embodiment, this body 23 is preferably made out of a hard elastomer material having low permeability to gas and possessing high ability to withstand the outside atmosphere so as to accommodate the usual conditions in which electrical gear fitted with such current feedthroughs normally operate. The degree of sealing that is required can be obtained by causing the elastomer to adhere to the insert constituted by the conductive element 18 and by the portions 20B, 20C, and 20D of the link and screen piece after an adhesion primary has been deposited on said insert, or indeed by molding the body directly onto the conductive element 18 and the piece 20.

It could also be envisaged to make the body of the feedthrough 23 out of a material of the resin kind and possessing qualities corresponding to those outlined above. The portion of the link and screen piece 20 that is to be covered by the resin of the feedthrough body 23 is then initially covered in a sealing layer of elastomer material onto which the resin for constituting the feedthrough body is then molded.

The body of the feedthrough 23 is molded on a single occasion and serves simultaneously to form: a piece that combines the core 23A in which the central conductive element 18 is housed longitudinally; an electric field distribution cone 23B in which the portions 20B, 20C, and 20D of the link and screen piece are embedded; and a succession of fins 23C.

The electric field characteristics of the current feedthrough of the invention are controlled by giving the feedthrough body 23 an appropriate conical shape around the portions of the link and screen piece 20 that are embedded therein at a distance from the conically-shaped air-elastomer interface. As mentioned above, this link and screen piece 20 is grounded because it is welded to the wall 17 of the cladding in which the opening 16 is formed, which opening it surrounds, it being naturally assumed that the cladding is itself grounded.

The portion of the feedthrough body 23 located beneath the portion 20B of the link and screen piece and which is thus housed in the cylindrical portion 20A is frustoconical in appearance, tapering from the portion 23B down to a diameter that is little different from the diameter of the conductive element 18. It can be short in length when the enclosure in which the feedthrough is housed in filled with a dielectric gas having high dielectric strength.

The outside diameter of the feedthrough is kept down to a value that is small although large enough to ensure that the electric field in the air around the electric field distribution cone is small, given the reduction in size made possible by the dielectric strength of the layer of insulating material between the flange 20 and the conductive element 18. Provision is also made for it to be no greater than that provided for the largest portion 20A of the link and screen piece 20 so as to make it possible for one or more current transformers 22 to be put into place or removed without requiring any other element of the current feedthrough to be displaced.

The small diameter cylindrical portion 20C of the flange 20 which is concentric about the conductive element 18 extends over a length which is selected in a manner known to the person skilled in the art so that the feedthrough possesses sufficient bending strength and stiffness to enable it to withstand the bending forces that might be applied to its outside end. The flare constituted by the portion 20D serves to reduce field concentration at this end.

Naturally, it is possible to envisage providing a shape for the end of a feedthrough of the invention that is welded which is adapted to the shape of the wall of the cladding to which the feedthrough is mounted, and more particularly to the shape of the opening to whose periphery the portion of the link and screen piece 20A is positioned and welded via its end. This end can specifically be of plane cross-section when the wall 17 is plane and of grooved section when the wall 17 is circularly cylindrical.

What is claimed is:

1. A hermetically sealed current feedthrough for gas-insulated outdoor electrical gear, the feedthrough being intended more particularly to provide connection to a bare conductor of a piece of gear housed inside metal cladding including a wall provided with an opening designed to put a first conductive element of the gear into connection with one end of a second conductive element housed axially inside the feedthrough, comprising:

a metal link and screen piece of cylindrical appearance that is held coaxially about the second conductive element by a body of molded insulating material covering it in part and forming a plug that is impermeable to gas, and wherein said link piece is terminated by a first cylindrical portion projecting from the body, with said piece being welded to a periphery of the opening via an end of said first cylindrical portion;

wherein the first circular cylindrical portion whose diameter corresponds to a diameter of the opening for the connection of the conductive element of the gear, at the periphery of which opening it is welded, is extended in a form of an electric field control screen by a portion of progressively tapering diameter situated remote from an end of the first cylindrical portion via which the piece is welded, and itself extended by a second cylindrical portion of diameter lying between the diameter of the welded first circular cylindrical portion and a diameter of the conductive element of the feedthrough, and in which the second cylindrical portion is terminated by a flared portion.

2. A current feedthrough according to claim 1, in which the body is a single block body of tubular shape made by being molded around the second conductive element of the feedthrough, covering said second conductive element except at its ends, forming a core for housing said second conductive element, the body having fins for deflecting a creepage line and having the link and screen piece embedded therein with an exception of the portion thereof whereby said piece is welded, so as to extend the core by a cone-forming portion for distributing an electric field.

3. A current feedthrough according to claim 1, in which the body of insulating material is made of a hard elastomer that is impermeable to gas and that withstands an outside atmosphere well.

4. A current feedthrough according to claim 1, in which the body of insulating material is made of a resin that is impermeable to gas and that withstands an outside atmosphere well, which resin is overmolded on the link and screen piece which is covered where it is overmolded in a sealing layer of elastomer material.

5. A current feedthrough according to claim 1, in which the link and screen piece is a piece of stainless steel.

6. A current feedthrough for gas-insulated outdoor electrical gear, the feedthrough being intended more particularly to provide connection to a bare conductor of a piece of gear housed inside metal cladding including a wall provided with an opening designed to put a first conductive element of the gear into connection with one end of a second conductive element housed axially inside the feedthrough, comprising:

a metal link and screen piece of cylindrical appearance that is held coaxially about the second conductive element by a body of molded insulating material covering it in part and forming a plug that is impermeable to gas, and wherein said link piece is terminated by a first cylindrical portion projecting from the body, with said piece being welded to a periphery of the opening via an end of said first cylindrical portion;

wherein the body is a single block body of tubular shape made by being molded around the second conductive element of the feedthrough, covering said second conductive element except at its ends, forming a core for housing said second conductive element, the body having fins for deflecting a creepage line and having the link and screen piece embedded therein with an exception of the portion thereof whereby said piece is welded, so as to extend the core by a cone-forming portion for distributing an electric field;

wherein an outside diameter of the body is no greater than that of a largest portion of the link and screen piece which is to be found at the welding end of said piece, thereby enabling at least one toroidal current transformer of diameter corresponding to said largest portion to be installed and removed.

7. A hermetically sealed current feedthrough for gas-insulated outdoor electrical gear, the feedthrough being intended more particularly to provide connection to a bare conductor of a piece of gear housed inside metal cladding including a wall provided with an opening designed to put a first conductive element of the gear into connection with one end of a second conductive element housed axially inside the feedthrough, comprising:

a metal link and screen piece of cylindrical appearance that is held coaxially about the second conductive element by a body of molded insulating material covering it in part and forming a plug that is impermeable to gas, and wherein said link piece is terminated by a circular cylindrical portion projecting from the body, with said piece being welded to a periphery of the opening via an end of said first cylindrical portion;

wherein the circular cylindrical portion is extended in a form of an electric field control screen by a portion of progressively tapering diameter situated remote from an end of the cylindrical portion via which the piece is welded.

* * * * *